United States Patent
Patel et al.

(10) Patent No.: US 9,845,186 B2
(45) Date of Patent: Dec. 19, 2017

(54) STRUCTURE AND METHOD OF SEALING A CLOSURE ASSEMBLY ONTO THE NECK FINISH OF A PLASTIC PRESSURE CONTAINER

(71) Applicant: GRAHAM PACKAGING COMPANY, L.P., York, PA (US)

(72) Inventors: Tapan Y. Patel, Nashua, NH (US); John E. Denner, York, PA (US); Scott E. Bysick, Elizabethtown, PA (US); Justin A. Howell, Mechanicsburg, PA (US)

(73) Assignee: GRAHAM PACKAGING COMPANY, L.P., York, PA (US)

( * ) Notice: Subject to any disclaimer, the term of this patent is extended or adjusted under 35 U.S.C. 154(b) by 0 days.

(21) Appl. No.: 15/088,977

(22) Filed: Apr. 1, 2016

(65) Prior Publication Data
US 2016/0288986 A1    Oct. 6, 2016

Related U.S. Application Data

(60) Provisional application No. 62/141,647, filed on Apr. 1, 2015.

(51) Int. Cl.
*B65D 41/10* (2006.01)
*B65D 83/40* (2006.01)
(Continued)

(52) U.S. Cl.
CPC ......... *B65D 83/40* (2013.01); *B65D 51/1644* (2013.01); *B65D 83/38* (2013.01); *B65D 83/44* (2013.01)

(58) Field of Classification Search
CPC ........ B65D 41/10; B65D 41/12; B65D 43/06; B65D 43/08; B65D 83/40; B65D 83/38; B65D 83/44; B65D 51/1644
(Continued)

(56) References Cited

U.S. PATENT DOCUMENTS 2,104,344 A * 1/1938 Heymann ................ B65D 3/02
229/5.5
3,161,330 A    12/1964 Sagarin et al.
(Continued)

FOREIGN PATENT DOCUMENTS

CN    1162948 A    10/1997
CN    1477030 A    2/2004
(Continued)

OTHER PUBLICATIONS

U.S. Appl. No. 13/251,830, dated Jun. 29, 2016 Notice of Appeal Filed.
(Continued)

*Primary Examiner* — J. Gregory Pickett
*Assistant Examiner* — Niki M Eloshway
(74) *Attorney, Agent, or Firm* — Baker Botts L.L.P.

(57) ABSTRACT

Plastic pressure container including a main body portion, a finish portion, and a closure assembly. The main body portion defines an interior space. The finish portion is unitary with the main body portion and defines a mouth in communication with the interior space. The finish portion has an inner surface, an outer surface and an upper rim proximate the mouth. The inner surface has an inner undercut defined therein proximate the upper rim. The outer surface has an outer undercut defined therein proximate the upper rim. The closure assembly is mounted to the finish portion in engagement with both the inner undercut and the outer undercut.

17 Claims, 4 Drawing Sheets

(51) Int. Cl.
*B65D 51/16* (2006.01)
*B65D 83/38* (2006.01)
B65D 39/04 (2006.01)
B65D 83/44 (2006.01)

(58) Field of Classification Search
USPC .......................... 215/43, 45, 324, 325, 327
See application file for complete search history.

(56) References Cited

U.S. PATENT DOCUMENTS

| | | | | |
|---|---|---|---|---|
| 3,197,055 | A | * | 7/1965 | Kelly .................. B65D 41/04 215/256 |
| 3,343,730 | A | | 9/1967 | Nier et al. |
| 3,392,861 | A | | 7/1968 | Dimmitt et al. |
| 4,297,306 | A | | 10/1981 | Yoshino et al. |
| 4,386,046 | A | | 5/1983 | Yoshino et al. |
| 4,469,253 | A | | 9/1984 | Beard |
| 4,497,758 | A | | 2/1985 | Clark |
| 4,561,555 | A | * | 12/1985 | Miller ................ B29C 49/4278 215/327 |
| 4,628,669 | A | | 12/1986 | Herron et al. |
| 4,818,575 | A | | 4/1989 | Hirata et al. |
| 5,052,577 | A | * | 10/1991 | Cuns-Rial ............. B65D 83/38 215/327 |
| 5,849,224 | A | | 12/1998 | Valyi |
| 6,099,766 | A | | 8/2000 | Aoki et al. |
| 6,173,907 | B1 | | 1/2001 | Benoist |
| 6,390,326 | B1 | | 5/2002 | Hung |
| 6,510,967 | B1 | | 1/2003 | DeSimone |
| 6,681,548 | B2 | | 1/2004 | Silvers et al. |
| 7,028,866 | B2 | | 4/2006 | Kunesh et al. |
| 7,033,656 | B2 | | 4/2006 | Nahill et al. |
| 8,505,764 | B2 | * | 8/2013 | Tasaki .................. B65D 83/38 215/324 |
| 2002/0160136 | A1 | | 10/2002 | Wong |
| 2004/0004088 | A1 | * | 1/2004 | Yerby .................. B65D 83/38 222/145.5 |
| 2004/0222244 | A1 | | 11/2004 | Groeger |
| 2005/0155980 | A1 | | 7/2005 | Neuhalfen |
| 2005/0284883 | A1 | * | 12/2005 | Granacher ............. B65D 83/60 222/95 |
| 2006/0065678 | A1 | * | 3/2006 | McBroom ............. B65D 83/14 222/402.1 |
| 2006/0108315 | A1 | * | 5/2006 | Britton ............... B29C 49/4242 215/321 |
| 2007/0245538 | A1 | | 10/2007 | Salameh |
| 2007/0267383 | A1 | | 11/2007 | McGeough et al. |
| 2007/0267437 | A1 | | 11/2007 | Nimmo et al. |
| 2007/0298139 | A1 | | 12/2007 | Balboni et al. |
| 2008/0054524 | A1 | | 3/2008 | Chisholm et al. |
| 2010/0206891 | A1 | * | 8/2010 | Boltshauser ....... B21D 51/2653 220/658 |
| 2010/0288796 | A1 | | 11/2010 | Gaudron |
| 2011/0171765 | A1 | * | 7/2011 | Wang ..................... F21K 9/00 438/29 |
| 2012/0103330 | A1 | | 5/2012 | David et al. |
| 2012/0211457 | A1 | | 8/2012 | Patel et al. |
| 2012/0241457 | A1 | * | 9/2012 | Hallman .............. B65D 83/38 220/309.1 |
| 2013/0037580 | A1 | | 2/2013 | Armstrong et al. |
| 2013/0082074 | A1 | | 4/2013 | Armstrong et al. |
| 2015/0329273 | A1 | * | 11/2015 | Salameh ............... B65D 83/38 222/402.1 |
| 2016/0016696 | A1 | * | 1/2016 | Bates ................ B65D 41/0464 220/300 |

FOREIGN PATENT DOCUMENTS

| | | |
|---|---|---|
| CN | 101351391 A | 1/2009 |
| DE | 201 14 821 U1 | 12/2001 |
| DE | 102 01 850 A1 | 8/2002 |
| EP | 0 426 580 A1 | 5/1991 |
| FR | 2 546 485 A1 | 11/1984 |
| JP | 2002-12277 | 1/2002 |
| WO | WO 2008/125126 A1 | 10/2008 |

OTHER PUBLICATIONS

U.S. Appl. No. 13/251,830, dated May 2, 2016 Response after Final Office Action.
U.S. Appl. No. 13/251,830, dated Mar. 2, 2016 Final Office Action.
U.S. Appl. No. 13/251,830, dated Jan. 4, 2016 Response to Non-Final Office Action.
U.S. Appl. No. 13/251,830, dated Sep. 3, 2015 Non-Final Office Action.
U.S. Appl. No. 13/251,830, dated Jul. 14, 2015 Response to Non-Final Office Action.
U.S. Appl. No. 13/251,830, dated Apr. 14, 2015 Non-Final Office Action.
U.S. Appl. No. 13/251,830, dated Dec. 22, 2014 Appeal Brief Filed.
U.S. Appl. No. 13/251,830, dated Oct. 20, 2014 Notice of Appeal Filed.
U.S. Appl. No. 13/251,830, dated Sep. 22, 2014 Response after Final Office Action.
U.S. Appl. No. 13/251,830, dated Jul. 21, 2014 Final Office Action.
U.S. Appl. No. 13/251,830, dated Jun. 11, 2014 Response to Non-Final Office Action.
U.S. Appl. No. 13/251,830, dated Jan. 28, 2014 Non-Final Office Action.
U.S. Appl. No. 13/251,830, dated Dec. 23, 2013 Amendment and Request for Continued Examination (RCE).
U.S. Appl. No. 13/251,830, dated Nov. 27, 2013 Response after Final Office Action.
U.S. Appl. No. 13/251,830, dated Sep. 30, 2013 Final Office Action.
U.S. Appl. No. 13/251,830, dated Aug. 14, 2013 Response to Non-Final Office Action.
U.S. Appl. No. 13/251,830, dated May 15, 2013 Non-Final Office Action.
U.S. Appl. No. 13/251,830, dated May 1, 2013 Response to Restriction Requirement.
U.S. Appl. No. 13/251,830, dated Mar. 20, 2013 Restriction Requirement Filed.
International Search Report and Written Opinion dated Jun. 27, 2016 in International Application No. PCT/US2016/025651.
International Search Report dated Jan. 25, 2013 for corresponding PCT/US2012/058518, dated Jan. 25, 2013.

* cited by examiner

STRUCTURE AND METHOD OF SEALING A CLOSURE ASSEMBLY ONTO THE NECK FINISH OF A PLASTIC PRESSURE CONTAINER

CROSS-REFERENCE TO RELATED APPLICATIONS

This application claims priority to U.S. Provisional Application No. 62/141,647, filed Apr. 1, 2015, which is incorporated by reference herein in its entirety.

BACKGROUND

1. Field of Disclosed Subject Matter

The disclosed subject matter relates generally to containers adapted to hold pressurized contents, for example aerosol mixtures. The disclosed structures and methods can be used for sealing a closure assembly onto the neck finish of a plastic pressure container.

2. Description of Related Art

Pressure containers can be used to store and dispense pressurized contents, such as aerosol mixtures and carbonated beverages or the like. Pressure containers commonly must be capable of withstanding internal pressures of the magnitude of 40-200 psi. Accordingly, metal containers having a cylindrical tube and upper and lower ends have been used for pressure containers. However, metallic containers have certain disadvantages, such as a tendency to rust over time and to scratch surfaces with which the metal containers may come into contact.

Attempts have been made to develop plastic pressure containers. However, the high internal pressures for pressure containers is significantly greater than pressures that are typically encountered in other packaging applications for which plastic material has been used, such as the packaging for unpressurized liquids. Accordingly, design considerations for plastic pressure containers are significantly different than for lower pressure packaging applications such as plastic beverage containers. An example of a plastic pressure container for storing and dispensing an aerosol mixture is provided in U.S. application Ser. No. 13/251,830, which is incorporated herein in its entirety.

As such, there is a continued need for a blow molded plastic pressure container assembly that provides an effective mount and seal between the finish portion of the plastic container and the closure assembly. The present disclosure satisfies these and other needs.

SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter provides a plastic pressure container. The container includes a main body portion, a finish portion and a closure assembly. The main body portion defines an interior space. The finish portion is unitary with the main body portion and defines a mouth in communication with the interior space. The finish portion includes an inner surface, an outer surface, and an upper rim proximate the mouth. The inner surface has an inner undercut defined therein proximate the upper rim. The outer surface has an outer undercut defined therein proximate the upper rim. The closure assembly is mounted to the finish portion in engagement with both the inner undercut and the outer undercut.

As embodied herein, the main body portion and finish portion can be fabricated from a material comprising polyethylene terephthalate. Alternatively, and as embodied herein, the main body portion and finish portion can be fabricated from polyethylene naphthalate (PEN), polyethylene furanoate (PEF), or other polyester based polymers. The inner undercut can extend substantially along an entire inner circumference of the inner surface of the finish portion. The outer undercut can extend substantially along an entire outer circumference of the outer surface of the finish portion.

As embodied herein, the plastic pressure container can include a sealing member disposed between the finish portion and the closure assembly. The finish portion can include at least one rib. In some embodiments, the finish portion can include at least two ribs. The finish portion can define a longitudinal axis, and at least one of the inner undercut and the outer undercut can define an engagement surface that is substantially perpendicular to the longitudinal axis. The closure assembly can be mounted to the finish portion by a crimped engagement. The plastic pressure container can contain an aerosol mixture comprising a propellant.

It is to be understood that both the foregoing general description and the following detailed description and drawings are examples and are provided for purpose of illustration and not intended to limit the scope of the disclosed subject matter in any manner.

The accompanying drawings, which are incorporated in and constitute a part of this specification, are included to illustrate and provide a further understanding of the structure and method of the disclosed subject matter. Together with the description the drawings serve to explain the principles of the disclosed subject matter.

BRIEF DESCRIPTION OF THE DRAWINGS

The subject matter of the application will be more readily understood from the following detailed description when read in conjunction with the accompanying drawings, in which:

As shown in FIG. 3, the closure assembly is mounted to the finish portion in engagement with both the inner undercut and the outer undercut of the finish portion.

DETAILED DESCRIPTION

Reference will now be made in detail to embodiments of the disclosed subject matter, an example of which is illustrated in the accompanying drawings. The disclosed subject matter will be described in conjunction with the detailed description of the system.

The disclosed subject matter provides improved sealing between a closure assembly and a finish portion of a plastic pressure container. The disclosed subject matter includes a hybrid sealing system, wherein the closure assembly can be crimped on both the inside and outside surfaces of a plastic neck finish. As such, the finish portion of a plastic pressure container is disposed between a sidewall of the closure assembly on both the inside and outside surfaces in order to secure the closure assembly to the finish portion on both surfaces of the finish portion. Such configuration thus provides multiple points of contact between the closure assembly and the finish portion of the plastic pressure container, thereby increasing the overall surface for engagement between the closure assembly and the finish portion. As embodied herein the closure assembly can be mounted on the plastic neck finish and in engagement therewith, for example, on both the inside and outside surfaces.

As embodied here, the plastic pressure container can be used to store and dispense a variety of liquid and gaseous components. The plastic pressure container can store and dispense pressurized components, for example components having pressures from about 40 psi to about 160 psi. By way of example, and as reference herein for illustration and not limitation, the plastic pressure container can include an aerosol mixture including a liquid propellant. In such applications, the plastic pressure container can be capable of withstanding pressures from about 80 psi to about 100 psi or greater (e.g., up to 160 psi). As further example, the plastic pressure container can include a carbonated liquid. In such applications, the plastic pressure container can be capable of withstanding pressures from about 40 psi to about 60 psi.

In accordance with one aspect the disclosed subject matter, a plastic pressure container is provided. The container includes a main body portion, a finish portion and a closure assembly. The main body portion defines an interior space. The finish portion is unitary with the main body portion and defines a mouth in communication with the interior space. The finish portion includes an inner surface, an outer surface, and an upper rim proximate the mouth. The inner surface has an inner undercut defined therein proximate the upper rim. The outer surface has an outer undercut defined therein proximate the upper rim. The closure assembly is mounted to the finish portion in engagement with both the inner undercut and the outer undercut.

Figure 1:
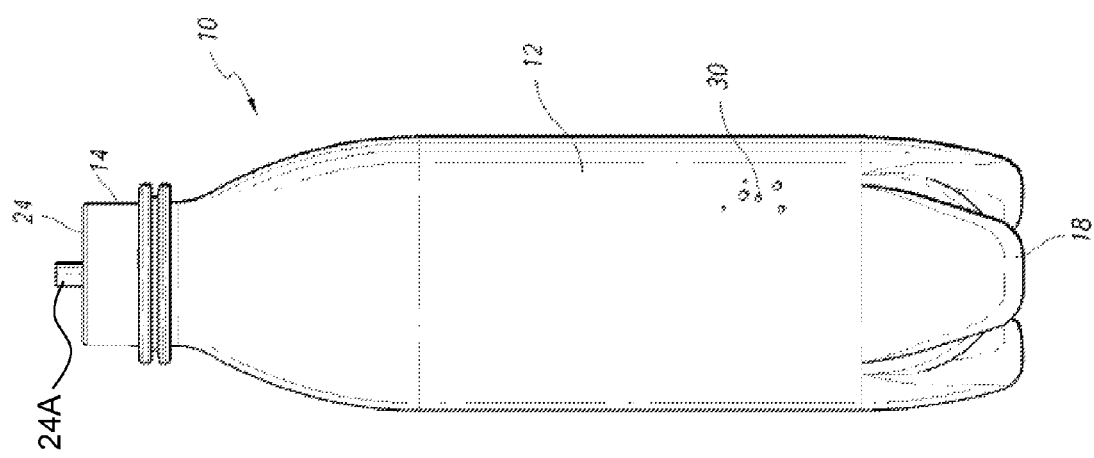
FIG. 1 is a side view of an exemplary embodiment of a plastic pressure container having a main body portion, finish portion, and closure assembly as described above and claimed herein. It will be apparent that variations to the size and shape of the plastic pressure container can be provided.

Solely for purpose of illustration, an exemplary embodiment of a plastic pressure container is shown in FIG. 1. The examples herein are not intended to limit the scope of the disclosed subject matter in any manner. Particularly, and as illustrated, the plastic pressure container 10 includes a main body portion 12, a finish portion 14, and a closure assembly 24 for an aerosol product, wherein the closure assembly 24 includes a valve suitable for dispensing aerosol products is depicted. The plastic pressure container 10 further includes a bottom portion 18, and can contain a variety of suitable contents 30 such as aerosol products and pressurized fluids, e.g., liquids or gaseous contents.

As embodied herein, the main body portion 12 defines an interior space within the plastic pressure container 10. The interior space can create a chamber for holding suitable contents, such as aerosol products and pressurized fluids, e.g., liquid or gaseous contents 30.

For example, the plastic pressure container embodied herein can include an aerosol mixture. The aerosol mixture preferably includes a propellant, which could be a liquefied gas propellant or a compressed or soluble gas propellant. Liquefied gas propellants that could be used include hydrocarbon propellants such as propane, isobutene, normal butane, isopentane, normal pentane and dimethyl ether, and hydrofluorocarbon propellants such as difluoroethane (HFC-152a), tetrafluoroethane (HFC-134a), and tetrafluoropropene (HFO-1234ze). Compressed and soluble gas propellants that could be used include carbon dioxide ($CO_2$), nitrous oxide ($N_2O$), nitrogen ($N_2$) and compressed air.

Alternatively, the plastic pressure container can include other pressurized contents that do not include a propellant. For example, and not limitation, the plastic pressure container can hold a carbonated liquid, such a soft drink or beer, or a flavor concentrate.

As embodied herein, and as depicted in FIG. 1, the finish portion 14 can be unitary with the main body portion 12. The finish portion 14 can define a mouth that is in communication within the interior space. For the purpose of further illustration, and not limitation, FIGS. 2-5 provide additional views of the finish portion.

Figure 3:
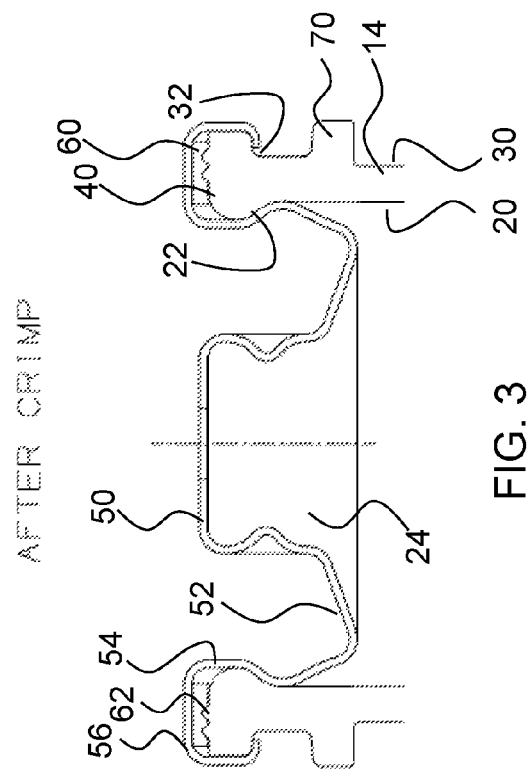
FIG. 3 is an enlarged cross-section view of the finish portion and closure assembly of the plastic pressure container shown in FIG. 1 after crimping the closure assembly onto the finish portion.
Figure 2:
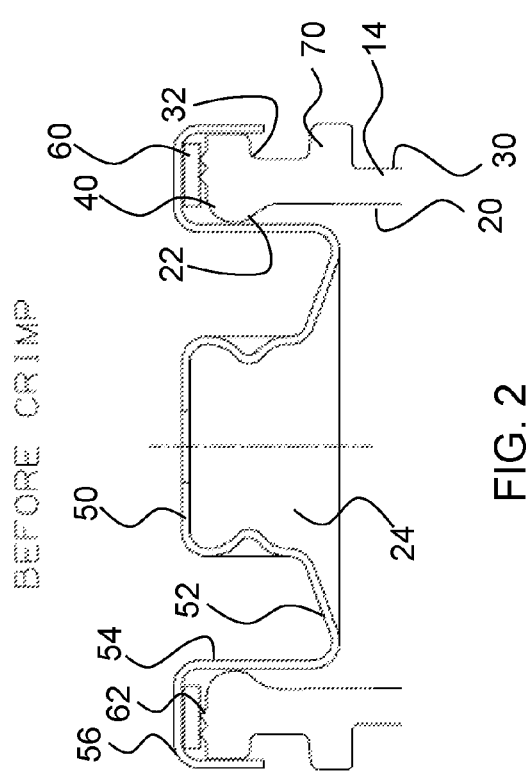
FIG. 2 is an enlarged detail in cross-section side view of the finish portion and closure assembly (with valve omitted for clarity) of the plastic pressure container shown in FIG. 1 prior to crimping the closure assembly onto the finish portion.

With reference to FIGS. 2 and 3, the finish portion includes an inner surface 20, an outer surface 30, and an upper rim 40 proximate the mouth. An inner undercut 22 is defined within the inner surface 20. The inner undercut 22 is proximate the upper rim 40. The inner undercut 22 can extend substantially along an entire inner circumference of the inner surface 20 of the finish portion 14. The inner undercut 22 thus can define an inner diameter (e.g., as illustrated by diameter D2 of FIG. 5) below the upper rim 40. The upper rim 40 can also define an inner diameter (e.g., as illustrated by diameter D1 of FIG. 5) proximate the mouth. As depicted in FIGS. 2 and 3, the inner diameter at the inner undercut 22 can be greater than the inner diameter at the upper rim 40.

Figure 4:
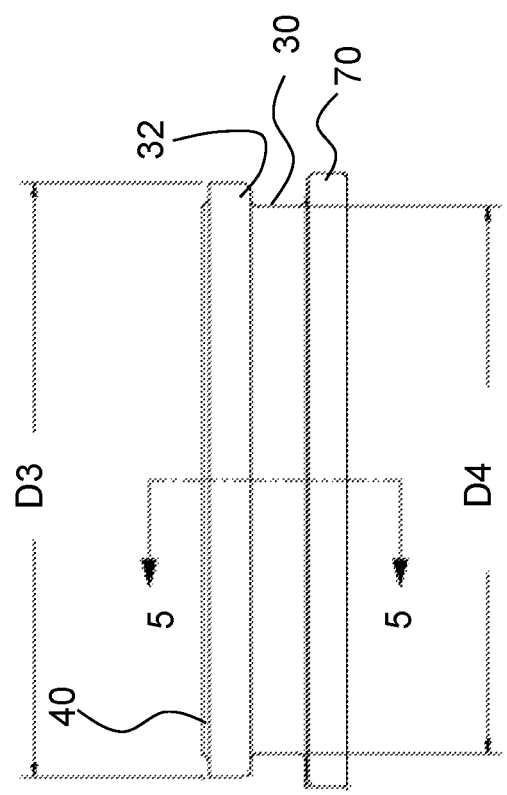
FIG. 4 is an enlarged detail in side view of the finish portion of the plastic pressure container, illustrating exemplary dimensions.

Additionally, as embodied herein, an outer undercut 32 is defined within the outer surface 30 of the finish portion 14. The outer undercut 32 is proximate the upper rim 40. The outer undercut 32 can extend substantially along an entire outer circumference of the outer surface 30 of the finish portion 14, for example, as depicted in FIG. 4.

Figure 5:
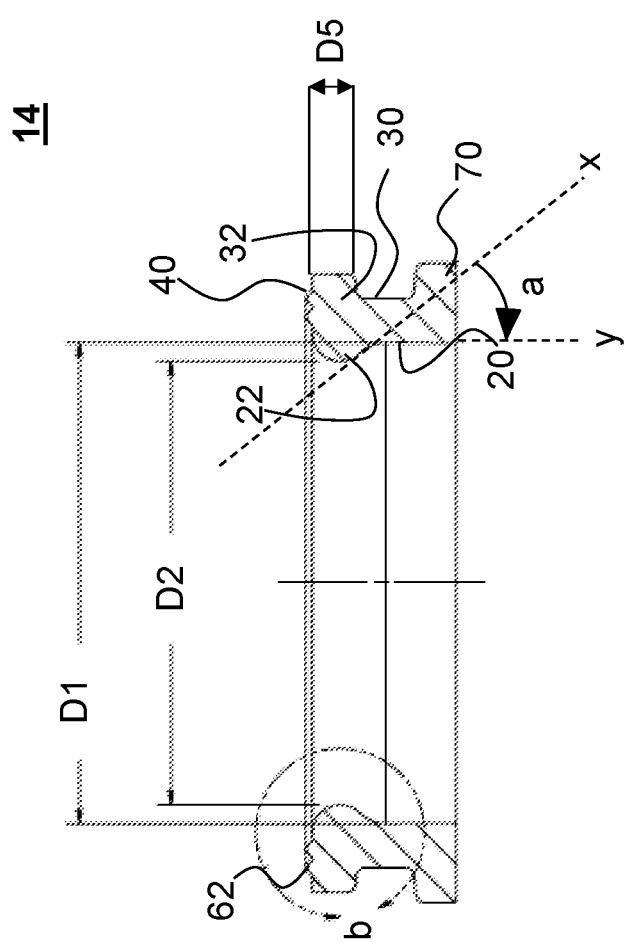
FIG. 5 is a cross-section view of the finish portion of the plastic pressure container, along line 5-5 in FIG. 4. The finish portion includes, as illustrated in FIG. 5, an inner surface having an inner undercut defined therein proximate the upper rim, and an outer surface having an outer undercut defined therein proximate the upper rim. Exemplary dimensions are illustrated.

FIG. 5 provides a detailed view of the finish portion 14, and depicts exemplary embodiments of the inner undercut 22 and the outer undercut 32. As depicted in FIG. 5, the inner undercut 22 can be contoured or curved. The pronouncement or complexity of the contour of the inner undercut 22 can vary as needed. For example, as embodied herein, the contour of the inner undercut can be more linear or more curved than as depicted in FIGS. 2-5. With reference to FIG. 5, for purpose of illustration, an angle a of the inner undercut 22 can be defined by line x, which is tangential to the inner undercut. The angle a of the inner undercut 22 can be the angle between line x and a vertical line y. By way of example, angle a can range between a minimum of about 10° and a maximum of about 50°.

As embodied herein, the outer undercut 32 can be contoured or curved. Alternatively, the outer undercut can have a polygonal shape in cross-section, for example a triangular or rectangular shape. The dimension between the outer undercut 32 and the upper rim 40, as defined by distance D5 in FIG. 5, can be based on, for example, the configuration of the valve assembly 24. In certain embodiments, this dimension is compatible with existing crimping systems and methods.

The depth of the inner undercut 22 and the outer undercut 32, respectively, can be based on various design specification, including the pressure of the contents in the plastic pressure container, and the material and construction of the closure assembly.

For purpose of example, and not limitation, reference will be made to exemplary dimensions for a finish portion and pressure container as depicted in FIG. 5. For illustration, the exemplary dimensions will be based on a pressure container having a diameter D1 of about 1 in. at the upper rim 40 and a maximum volume of about 1 L. Such a container is in accordance with industry standards, and thus could provide compatibility with existing manufacturing and packaging processes. However, this example is not intended to limit the scope of this disclosure, and a person of ordinary skill in the art would recognize that these techniques and dimensions can be adapted to various-sized pressure containers in accordance with the disclosed subject matter.

Ranges for selected dimensions depicted in FIGS. 4 & 5 are reproduced in Table 1 below. Table 1 also provides an Example embodiment to illustrate exemplary ratios between the various dimensions. In Table 1, the depth of the outer undercut is equal to one-half of the difference between outer diameter D3 at the upper rim 40 and outer diameter D4 at the outer undercut 32.

TABLE 1

Exemplary dimensions of the finish portion.

| Dimension | Minimum | Maximum | Example |
| --- | --- | --- | --- |
| Inner diameter at inner undercut (D2) | 1.020 in. | 1.120 in. | 1.084 in. |
| Angle of inner undercut (a) | 10° | 50° | 35° |
| Depth of outer undercut | 0.035 in. | 0.060 in. | 0.055 in. |
| Distance between outer undercut and upper rim (D5) | 0.050 in. | 0.200 in. | 0.098 in. |

As embodied herein, the finish portion 14 can further include a flange 70 on the outer surface 30. The flange 70 can be configured as a support ledge, which can be used for part transfer during manufacture and assembly of the finish portion and/or pressure container. The flange 70 can also provide extra strength and support to the assembled pressure container, e.g., by counteracting internal pressures within the container.

As embodied herein, the finish portion 14 can further include various features for fitting a removable lid or cap onto the plastic pressure container. By way of example the finish portion 14 can include one or more threads, clips, ribs, ridges, and the like for engagement with a removable lid or cap.

As embodied herein, the main body portion 12 and finish portion 14 can be fabricated from a material comprising polyethylene terephthalate. Alternatively, and as embodied herein, the main body portion and finish portion can be fabricated from polyethylene naphthalate (PEN), polyethylene furanoate (PEF), or other polyester based polymers.

With further reference to FIG. 1, the closure assembly 24 can include a valve 24A or the like for dispensing contents. The closure assembly is mounted to the finish portion 14 of the plastic pressure container 10. FIGS. 2 and 3 provide detailed views of the engagement between the finish portion 14 and the closure assembly 24. FIG. 2 shows the engagement of the finish portion 14 and the closure assembly 24 prior to crimping, whereas FIG. 3 shows the engagement of the two components after crimping. As depicted in FIG. 3, the closure assembly 24 is in engagement with both the inner undercut 22 and the outer undercut 32 of the finish portion 14.

As embodied herein, for purpose of illustration only and not limitation, the closure assembly 24 can be a metal closure assembly, for example, a metal valve cup. As such, the encapsulated plastic of the finish portion 14 can have controlled deformation due to the metal boundary restricting both sides of the finish portion 14. Further, the entire laminate structure (i.e., metal/plastic/metal) likewise will move in unison when exposed to high filling and service conditions. The laminate structure also provides strength to withstand stresses and strains from crimping and filling operations, and the hermetic seal created between the plastic and metal can be sufficiently stable to inhibit a pathway for leakage of the contents from the container. Alternatively or additionally, the closure or closure assembly can be a plastic closure assembly. For example, the closure or closure assembly can be wholly plastic, wholly metallic, or contain both plastic and metallic components. The closure or closure assembly can have any configuration features suitable for dispensing the aerosol product or pressurized fluid, e.g., gaseous or liquid contents, of the plastic pressure container.

In embodiments having a metal closure assembly, and with reference to FIGS. 2 and 3, the closure assembly 24 can include a metallic panel 50. A valve stem (not depicted) can be mounted to the metallic panel 50. The metallic panel 50 can include an annular downwardly extending portion 52 that includes an outer wall portion 54, which is oriented so as to be substantially straight and vertical, permitting convenient insertion of the blank closure assembly 24 into the opening. The metallic panel 50 also preferably includes a flange portion 56 that is congruent with and seals against the upper rim 32 of the finish portion 14.

The closure assembly 24 can be mounted to the finish portion by a crimped engagement. As depicted in FIG. 3, when crimped, the flange portion 56 is congruent with and engaged within both the inner undercut 22 and the outer undercut 32. For example, the finish portion 14 can define a longitudinal axis, and at least one of the inner undercut 22 and the outer undercut 32 can define an engagement surface that is substantially perpendicular to the longitudinal axis. A variety of crimping techniques can be used to facilitate crimped engagement with both the inner undercut 22 and the outer undercut 32, as described below.

As embodied herein, and with reference to FIGS. 2 and 3, the plastic pressure container can further include a sealing member 60 disposed between the finish portion 14 and the closure assembly 24. The sealing member can be a gasket or an O-ring, and can be fabricated from Buna-N, neoprene, Viton, butyl, silicone, or other suitable materials. The finish portion 14 can optionally include at least one rib 62 extending along the surface against which the sealing member will engage. In some embodiments, for example, as depicted in FIGS. 2 and 3, the finish portion 14 can include at least two ribs 62. The rib(s) 62 can be disposed on the upper rim 40 of the finish portion 14. The rib(s) 62 can extend substantially along an entire circumference of the upper rim 40.

As embodied herein, the plastic pressure container can be fabricated by any suitable method. In certain aspects, a method of sealing a closure assembly onto the neck finish of a plastic pressure container is provided. For example, the plastic pressure container can be fabricated by creating a perform by injection molding, where the preform includes the finish portion 14 having an inner undercut 22, an outer undercut 32, and, optionally, one or more ribs 62. Because the finish portion 14 is configured to include both an inner undercut 22 and an outer undercut 32 for engagement with the closure assembly 24, each undercut can be shallower (i.e., smaller undercut dimension) than if a single undercut were provided, yet still provide sufficient engagement surface. In this manner, the use of shallower undercut can simplify manufacturing of the finish portion 14 by injection molding.

Furthermore, the finish portion 14 of the preform can be crystallized to further strengthen the finish for engagement with the closure assembly. For example, the finish portion 14 can be crystallized using heat that is localized at only the finish portion of the preform. During crystallization, the inner undercut portion can be supported to maintain the geometry. For example, a plug can be inserted into the mouth of the finish portion 14 to provide support to the inner undercut 22 and maintain the inner diameter of the inner undercut 22. As embodied herein, the plug can be provided in a single cylindrical to support the finish portion 14 at a location above the inner undercut 22. Additionally, one or more pins can be used to support the outer undercut 32 during crystallization.

After the finish portion has been crystallized, the main body portion 12 can be blow molded to its final dimensions. With reference to FIG. 1, the main body portion 12 can be generally bottle shaped, or can have any alternative suitable shape. The main body portion 12 can be unitary with the finish portion 14 and can include a bottom portion 18.

Once the main body portion 12 has been blow molded, the interior space can be filled with any suitable contents 30, and the closure assembly 24 can be mounted onto the finish portion 14 and crimped to engage the closure assembly 24 with the finish portion 14. With reference to FIGS. 2 and 3, a tool can be used to apply pressure to crimp the outer wall portion 54 of the closure assembly 24 outwardly into the position that is shown in FIG. 3, such that a portion of the outer wall portion 54 is seated securely against the inner undercut 22. Additionally, the flange portion 56 can be crimped such that a portion of the flange portion 56 is seated securely against the outer undercut 32. Thus, the closure assembly 24 can be mounted such that the closure assembly 24 is in engagement with both the inner undercut 22 and the outer undercut 32. In this manner, the closure assembly 24 can be firmly secured against dislodgement from the finish portion 14 that could otherwise result from the internal pressurization of the container.

During crimping, pressure can be applied to both of the inner surface 20 and the outer surface 30 of the finish portion 14 in order to crimp the closure assembly 24 against both of the inner undercut 22 and outer undercut 32. Therefore, during crimping, the finish portion 14 can be supported at both the inner surface 20 and the outer surface 30. Providing support to both surfaces can reduce the amount of stress placed on the finish portion 14 during the crimping process and thus prevent or minimize cracking and deformation of the finish portion 14.

While the disclosed subject matter is described herein in terms of certain preferred embodiments, those skilled in the art will recognize that various modifications and improvements can be made to the disclosed subject matter without departing from the scope thereof. Moreover, although individual features of one embodiment of the disclosed subject matter can be discussed herein or shown in the drawings of the one embodiment and not in other embodiments, it should be apparent that individual features of one embodiment can be combined with one or more features of another embodiment or features from a plurality of embodiments.

Each of the components described herein can be made of any suitable material (e.g., plastics, composites, metal, etc.) and technique for its intended purpose. In addition to the various embodiments depicted and claimed, the disclosed subject matter is also directed to other embodiments having any other possible combination of the features disclosed and claimed herein. As such, the particular features presented herein can be combined with each other in other manners within the scope of the disclosed subject matter such that the disclosed subject matter includes any suitable combination of the features disclosed herein. Furthermore, although reference is made to a plastic pressure container throughout this disclosure, containers made of other suitable materials can likewise include the features disclosed herein. Similarly, the container need not be a pressure container, and the closure assembly can include a wide variety of suitable closures, such as a cap, lid, or other feature for dispensing the contents of the container. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A plastic pressure container, comprising:
    a main body portion defining an interior space;
    a finish portion unitary with the main body portion and defining a mouth in communication with the interior space, the finish portion having an inner surface, an outer surface and an upper rim proximate the mouth, the inner surface having an inner undercut defined therein proximate the upper rim, the inner undercut having a curved shape in cross-section, and the outer surface having an outer undercut defined therein proximate the upper rim, the outer undercut having a polygonal shape in cross-section, wherein the inner undercut defines a first depth relative to an inner diameter D2 proximate the mouth and the outer undercut defines a second depth relative to an outer diameter D3 proximate the mouth, the second depth being different than the first depth; and
    a closure assembly mounted to the finish portion in engagement with both the inner undercut and the outer undercut.

2. The plastic pressure container of claim 1, wherein the main body portion and finish portion are fabricated from a material comprising polyethylene terephthalate.

3. The plastic pressure container of claim 1, wherein the main body portion and finish portion are fabricated from a material comprising polyethylene naphthalate and/or polyethylene furanoate.

4. The plastic pressure container of claim 1, wherein the inner undercut extends substantially along an entire inner circumference of the inner surface of the finish portion.

5. The plastic pressure container of claim 1, wherein the outer undercut extends substantially along an entire outer circumference of the outer surface of the finish portion.

6. The plastic pressure container of claim 1, further comprising a sealing member disposed between the finish portion and the closure assembly.

7. The plastic pressure container of claim 6, wherein the finish portion includes at least one rib disposed on the outer surface for engagement with the sealing member.

8. The plastic pressure container of claim 6, wherein the finish portion includes at least two ribs disposed on the outer surface for engagement with the sealing member.

9. The plastic pressure container of claim 1, wherein the finish portion defines a longitudinal axis, and wherein at least one of the inner undercut and the outer undercut defines an engagement surface substantially perpendicular to the longitudinal axis.

10. The plastic pressure container of claim 1, wherein the closure assembly is mounted to the finish portion by a crimped engagement.

11. The plastic pressure container of claim 1, wherein the closure assembly includes a valve.

12. The plastic pressure container of claim 1, further comprising an aerosol mixture comprising a propellant within the interior space.

13. The plastic pressure container of claim 1, further comprising a fluid in the interior space pressured between about 40 to 160 psi.

14. The plastic pressure container of claim 1, wherein the finish portion is crystallized.

15. The plastic pressure container of claim 1, wherein the inner undercut defines an angle "a" relative to a vertical portion "y" of the inner surface, the angle "a" being between 10° and 50°.

16. The plastic pressure container of claim 1, wherein the inner undercut has the curved shape in cross-section and the outer undercut has the polygonal shape in cross-section before mounting the closure assembly thereto.

17. A plastic pressure container comprising:
a main body portion defining an interior space;
a finish portion unitary with the main body portion and defining a mouth in communication with the interior space, the finish portion having an inner surface, an outer surface and an upper rim proximate the mouth, the inner surface having an inner undercut defined therein proximate the upper rim, the inner undercut having a curved shape in cross-section, and the outer surface having an outer undercut defined therein proximate the upper rim, the outer undercut having a polygonal shape in cross-section, wherein the inner undercut defines a first depth relative to an inner diameter D2 proximate the mouth and the outer undercut defines a second depth relative to an outer diameter D3 proximate the mouth, the second depth being different than the first depth;
a closure assembly mounted to the finish portion in engagement with both the inner undercut and the outer undercut; and
contents in the interior space.

\* \* \* \* \*